(12) United States Patent
Charlemagne et al.

(10) Patent No.: US 10,336,464 B2
(45) Date of Patent: Jul. 2, 2019

(54) AIRCRAFT PROPULSION ASSEMBLY WITH FIRE EXTINGUISHING SYSTEM

(71) Applicant: SNECMA, Paris (FR)

(72) Inventors: Pierrick Charlemagne, Moissy-Cramayel (FR); Delphine Leroux, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 9 days.

(21) Appl. No.: 15/100,246

(22) PCT Filed: Dec. 22, 2014

(86) PCT No.: PCT/FR2014/053497
§ 371 (c)(1),
(2) Date: May 27, 2016

(87) PCT Pub. No.: WO2015/097391
PCT Pub. Date: Jul. 2, 2015

(65) Prior Publication Data
US 2016/0368618 A1    Dec. 22, 2016

(30) Foreign Application Priority Data

Dec. 24, 2013  (FR) ...................................... 13 63544

(51) Int. Cl.
*A62C 3/08*  (2006.01)
*F02C 7/12*  (2006.01)
(Continued)

(52) U.S. Cl.
CPC ................ *B64D 45/00* (2013.01); *A62C 3/08* (2013.01); *B64C 7/02* (2013.01); *B64D 29/00* (2013.01);
(Continued)

(58) Field of Classification Search
CPC ...... A62C 3/08; A62C 99/0018; B64D 29/00; B64D 2045/009; B64D 45/00;
(Continued)

(56) References Cited

U.S. PATENT DOCUMENTS 4,351,394 A * 9/1982 Enk .......................... A62C 3/08
                                                   169/16
6,082,464 A * 7/2000 Mitchell ................... F02C 7/25
                                                   169/43
(Continued)

FOREIGN PATENT DOCUMENTS

| EP | 2 624 353 A1 | 8/2013 |
|---|---|---|
| GB | 2 057 574 A | 4/1981 |
| WO | 2006/076649 A2 | 7/2006 |

OTHER PUBLICATIONS

Hariram, Sham; Philipp, Paul; Dunmeyer, Dave; "Fire Protection: Engines and Auxiliary Power Units"; 2010; Boeing Aero Magazine, p. 15-19; <http://www.boeing.com/commercial/aeromagazine/articles/2010_q4/pdfs/AERO_2010_Q4_article3.pdf>.*

(Continued)

*Primary Examiner* — Chee-Chong Lee
*Assistant Examiner* — Cody J Lieuwen
(74) *Attorney, Agent, or Firm* — Christensen O'Connor Johnson Kindness PLLC

(57) ABSTRACT

An aircraft propulsion assembly includes an engine, a nacelle surrounding the engine, and a system for extinguishing a fire that may occur in the engine and/or in the nacelle. The extinguishing system has means for supplying an extinguishant to at least one extinguishant distribution pipe which opens into a cavity of the engine and/or a cavity of the nacelle. The extinguishing system also includes means for supplying said at least one pipe with air so as to ventilate the or each cavity.

6 Claims, 2 Drawing Sheets

(51) Int. Cl.
    *F02C 7/25*     (2006.01)
    *B64C 7/02*     (2006.01)
    *B64D 29/00*     (2006.01)
    *B64D 45/00*     (2006.01)
    *F01D 25/24*     (2006.01)

(52) U.S. Cl.
    CPC .............. *F01D 25/24* (2013.01); *F02C 7/12* (2013.01); *F02C 7/25* (2013.01); *B64D 2045/009* (2013.01); *F05D 2220/323* (2013.01); *Y02T 50/675* (2013.01)

(58) Field of Classification Search
    CPC . B64D 37/32; B64C 7/02; F01D 25/24; F02C 7/12; F02C 7/25; F05D 2220/323; Y02T 50/675
    USPC .......... 169/46, 62, 43; 244/129.2; 60/39.091
    See application file for complete search history.

(56) References Cited

U.S. PATENT DOCUMENTS 6,935,433 B2 * 8/2005 Gupta .................. A62C 3/002
    169/11

2006/0273223 A1 * 12/2006 Haaland .................. A62C 3/06
    244/129.2

OTHER PUBLICATIONS

"Fan.", Encyclopdia Britannica, Jul. 14, 2008. academic.eb.com/levels/collegiate/article/fan/33685. Accessed Nov. 17, 2017.*
SKYbrary, "Aircraft Electrical Systems", Nov. 22, 2013, <https://www.skybrary.aero/index.php/Aircraft_Electrical_Systems>.*
SKYbrary, "Engine Fire Protection", Aug. 26, 2013, <https://www.skybrary.aero/index.php/Engine_Fire_Protection>.*
Written Opinion of the International Searching Authority dated Apr. 24, 2015 issued in corresponding International Application No. PCT/FR2014/053497, filed Dec. 22, 2014, 5 pages.
International Preliminary Report on Patentability dated Jun. 28, 2016 issued in corresponding International Application No. PCT/FR2014/053497, filed Dec. 22, 2014, 1 page.
International Search Report dated Apr. 24, 2015, issued in corresponding International Application No. PCT/FR2014/053497, filed Dec. 22, 2014, 7 pages.
Written Opinion dated Apr. 24, 2015, issued in corresponding International Application No. PCT/FR2014/053497, filed Dec. 22, 2014, 5 pages.

* cited by examiner

AIRCRAFT PROPULSION ASSEMBLY WITH FIRE EXTINGUISHING SYSTEM

TECHNICAL FIELD

The present invention relates to the field of ventilation of an aircraft propulsion assembly.

PRIOR ART

An aircraft propulsion assembly comprises an engine and a nacelle surrounding said engine, which is generally a turbine engine. The nacelle comprises a rotationally symmetrical casing which defines an annular flow duct for a flow of air around the engine, this flow of air being referred to as the secondary flow in the case of a bypass turbine engine. The nacelle defines a first annular cavity around the casing. Some equipment in the propulsion assembly is mounted in the nacelle, i.e. in the aforementioned annular cavity, and can be fastened to the casing of said nacelle. The external wall of the nacelle generally comprises removable cowls for allowing access to this equipment during a maintenance operation.

The engine comprises an internal annular flow duct for a flow of air referred to as the primary flow in the case of a bypass turbine engine. The engine comprises rotationally symmetrical coaxial casings which are surrounded by a rotationally symmetrical wall, the inside of which defines the duct for the secondary flow. This wall extends at a distance from the engine casings and defines a second annular cavity around said casings. Some equipment is mounted in this second annular cavity.

The equipment mounted in the cavities in the propulsion assembly is sensitive to heat to a greater or lesser extent and is ventilated during operation. This is in particular the case for an EEC-type on-board computer which in particular allows actuators of the engine to be monitored with a view to optimising the turbine-engine performance (FR-B1-2 960 912). This computer is generally mounted in the nacelle together with other equipment (accessory gearbox (AGB), exchangers, etc.).

In order to ventilate the internal cavity in the nacelle, said nacelle comprises a scoop for drawing off air during flight, the drawn-off air then being discharged through an air outlet grating of the nacelle. However, on the ground, this ventilation is virtually non-existent and the natural convection in the annular space in the nacelle may prove to be insufficient to ensure the ventilation of the equipment thereof. During operation, the computer generates significant thermal power which it has to dissipate regardless of whether the engine is in operation or is not running. Moreover, even when the engine is not running after having been in operation, the hot parts of the engine continue to radiate heat and heat up the peripheral cooler parts of the engine, which cooler parts can therefore reach temperatures when the engine is not running that are close to or greater than the temperatures thereof when the engine is in operation.

Therefore, there is a real need for a system which is capable of ventilating this type of cavity in a propulsion assembly even when the engine is not running.

Moreover, an aircraft propulsion assembly is provided with a system for extinguishing a fire which may break out in the engine and/or in the nacelle. This extinguishing system comprises means for supplying an extinguishing agent to at least one pipe which is intended for dispensing said extinguishing agent and leads into a cavity in the engine and/or a cavity in the nacelle. This extinguishing system is generally connected to a fire detection system (of the FDU type (fire detection unit)) which comprises sensors which are mounted on the engine and/or the nacelle and are intended for emitting an alert signal for the attention of the aircraft pilot when at least one of the sensors detects a fire breaking out.

In the current art, the sole purpose of the pipe of the extinguishing system is to dispense extinguishing agent. Given the fact that fires rarely break out, this pipe is generally never used. However, an aircraft propulsion assembly always comprises said pipe for reasons of safety and certification.

The present invention provides a simple, effective and economical solution to the above-mentioned need from the prior art.

SUMMARY OF THE INVENTION

The invention proposes an aircraft propulsion assembly comprising an engine, a nacelle surrounding the engine, and a system for extinguishing a fire which may break out in the engine and/or in the nacelle, this extinguishing system comprising means for supplying extinguishing agent to at least one pipe which is intended for dispensing said extinguishing agent and leads into a cavity in the engine and/or a cavity in the nacelle, characterised in that said propulsion assembly further comprises means for supplying air to said at least one pipe in order to ventilate the cavity/cavities.

The invention therefore consists in giving a new additional function to a known means. Indeed, as is the case in the prior art, the pipe for dispensing the extinguishing agent of the fire extinguishing system is used for dispensing this agent into the cavity/cavities in the propulsion assembly if a fire breaks out. According to the invention, this pipe is also used to ventilate this cavity/these cavities. For this purpose, the pipe is connected to air supply means which provide the pipe with an air flow, which air flow thus being conveyed via the pipe as far as the cavity/cavities to be ventilated. The invention thus makes it possible to use an existing means (pipe) to convey ventilation air as far as a cavity in the nacelle and/or the engine, this existing means being used for a completely different purpose in the prior art (dispensing extinguishing agent). As described above, the extinguishing system of a propulsion assembly is rarely used. The pipe thereof can therefore be used to ventilate the cavities in the propulsion assembly even when the engine is not running. Indeed, the air supply means of the pipe advantageously operate independently of the engine and can therefore operate when the engine is not running. The equipment mounted in the cavities in the propulsion assembly can therefore be ventilated when the engine is not running, and this makes it possible to increase the service life of this equipment.

The air supply means preferably comprise a ventilator fan. This ventilator fan may be an electric ventilator fan.

The supply means may be connected to said at least one pipe by a valve and/or non-return flap. They may be connected to said pipe by means of a Y-shaped bypass for example.

The supply means can be housed in the nacelle.

In a variant, the supply means can be housed in a strut for connecting the propulsion assembly to the aircraft. The connection between a propulsion assembly and the strut thereof generally consists of a fire-resistant wall which is suitable for minimising the spread of a fire which may break out in the propulsion assembly. The supply means are thus protected from a fire which may break out in the nacelle.

The supply means may be designed to output an air flow rate of between 1 and 500 g/s.

The pipe may advantageously comprise at least one outlet located close to an air intake scoop of the nacelle or engine.

The present invention also relates to a method for ventilating a cavity in an engine and/or a cavity in a nacelle of an aircraft propulsion assembly, this propulsion assembly comprising a system for extinguishing a fire which may break out in the engine and/or in the nacelle, this extinguishing system comprising means for supplying extinguishing agent to the least one pipe which is intended for dispensing said extinguishing agent and leads into the cavity in the engine and/or the cavity in the nacelle, characterised in that said method comprises supplying air to said at least one pipe.

DESCRIPTION OF THE DRAWINGS

The invention will be better understood and other details, features and advantages of the invention will emerge upon reading the following description given by way of non-limiting example and with reference to the accompanying drawings, in which.

DETAILED DESCRIPTION

Figure 1:
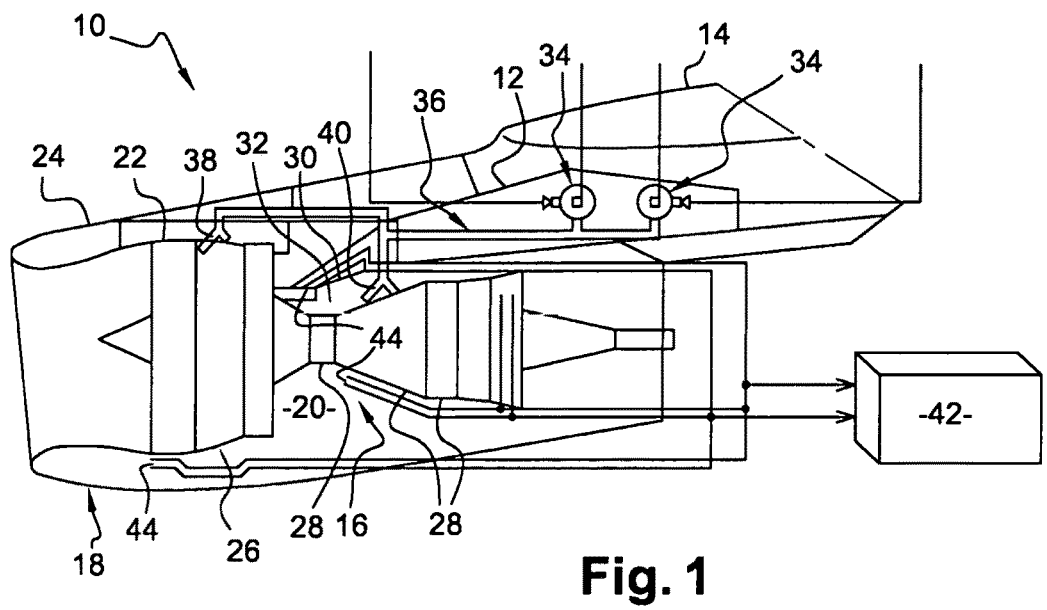
FIG. 1 is a schematic side view of an aircraft propulsion assembly.

Reference is first made to FIG. 1, which shows an aircraft propulsion assembly 10, this propulsion assembly comprising a strut 12 for connection to a structural part of the aircraft, which is in this case a wing 14 of the aircraft.

The propulsion assembly 10 comprises an engine 16 of the turbine engine type which is surrounded by a nacelle 18, the nacelle 18 defining a first annular flow duct 20 for a secondary flow around the engine which comprises a second internal flow duct (not shown) for a primary flow.

The engine 16 typically comprises, from upstream to downstream, in the direction of the flows, a fan, at least one compression module, a combustion chamber, at least one turbine module, and an exhaust nozzle for ejecting combustion gases.

The fan of the engine 16 is surrounded by a casing 22 of the nacelle 18, which is itself surrounded by a rotationally symmetrical wall 24 of the nacelle. Equipment is mounted in the annular cavity 26 defined by the external wall 24 and the casing 22 of the nacelle 18.

The compression module, the combustion chamber and the turbine module comprise external casings 28 which are surrounded by a rotationally symmetrical wall 30. The inside of this wall 30 defines the duct 20 for the secondary flow and extends at a distance from the external casings 28 so as to define an annular cavity 32 therewith, in which cavity equipment is also housed.

The propulsion assembly 10 further comprises a system for extinguishing a fire which may break out in the engine 16 and/or in the nacelle 18. This extinguishing system comprises means 34 for supplying extinguishing agent to the at least one pipe 36 for dispensing said extinguishing agent.

As can be seen in the figure, this pipe 36 may comprise a plurality of inlets (in this case two) which are each connected to supply means 34, and a plurality of outlets 38 (in this case two). In the example shown, the pipe 36 comprises a first outlet 38 in the cavity 26 in the nacelle 18 and a second outlet 40 in the cavity 32 in the engine 16. In this figure, each outlet 38, 40 is Y-shaped and comprises two outlet openings for spraying extinguishing agent in directions substantially tangential to the casing 22 or casings 28. The outlet 38 is preferably located close to an air intake scoop of the nacelle 16 (for ventilating the cavity 26 when the engine is in operation) and the outlet 40 is preferably located close to an air intake scoop of the engine (for ventilating the cavity 32 when the engine is in operation).

The outlets 38 and 40 are oriented so as to coact with the air intake scoops of the nacelle 18 and of the engine 16, respectively, in order to generate flows in similar directions.

This makes it possible to prevent the extinguishing agent from leaving the regions to be extinguished before this has been achieved. Moreover, by virtue of the invention, aeration by means of the scoop or by means of the invention is similar and makes it easier to manage the ventilation flows.

The pipe 36 is made of a material which is resistant to fire and in particular to very high temperatures (for example above 1000° C.).

The supply means 34 may comprise a pressurised tank for extinguishing agent (consisting of halon for example), an outlet of which is connected to an inlet of the pipe 36 by means of a priming system, for example a pyrotechnic primer. This priming system is controlled remotely by the aircraft pilot from the cockpit of the aircraft.

The extinguishing system is connected to a fire detection system 42 (for example of the FDU type) which is connected to sensors 44 which are mounted on the engine 16 and the nacelle 18 and are each intended to emit an alert signal for the attention of the aircraft pilot when at least one of the sensors 44 detects a fire breaking out. The sensors 44 comprise thermocouples, for example.

Figure 2:
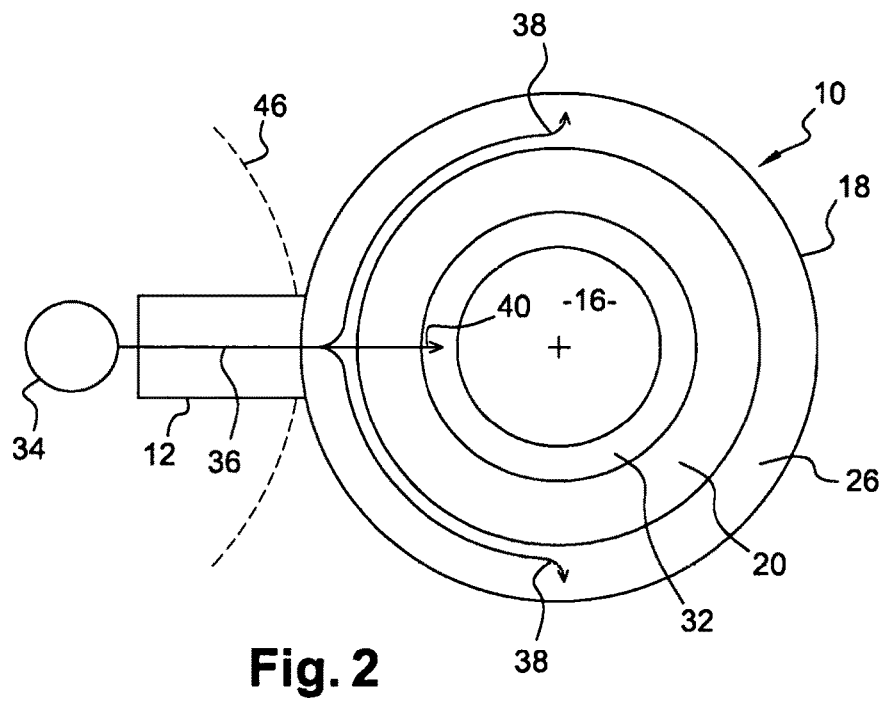
FIG. 2 is a highly schematic front view of an aircraft propulsion assembly.

As is schematically shown in FIG. 2, the supply means 34 are generally mounted on the perimeter of the aircraft, this perimeter being schematically defined in this case by the broken lines 46 and comprising the strut 12. The pipe 36 extends from the supply means 34 as far as the cavities 26, 32. The pipe 36 therefore has to pass through the duct for the secondary flow 20 and can, for this purpose, be housed in a tubular arm through which support systems of an intermediate casing of the engine pass. The broken lines 46 represent a fire-resistant wall to be passed through, and therefore there must be the minimum amount of pipe at this location in order to minimise the number of openings in the wall.

Figure 3:
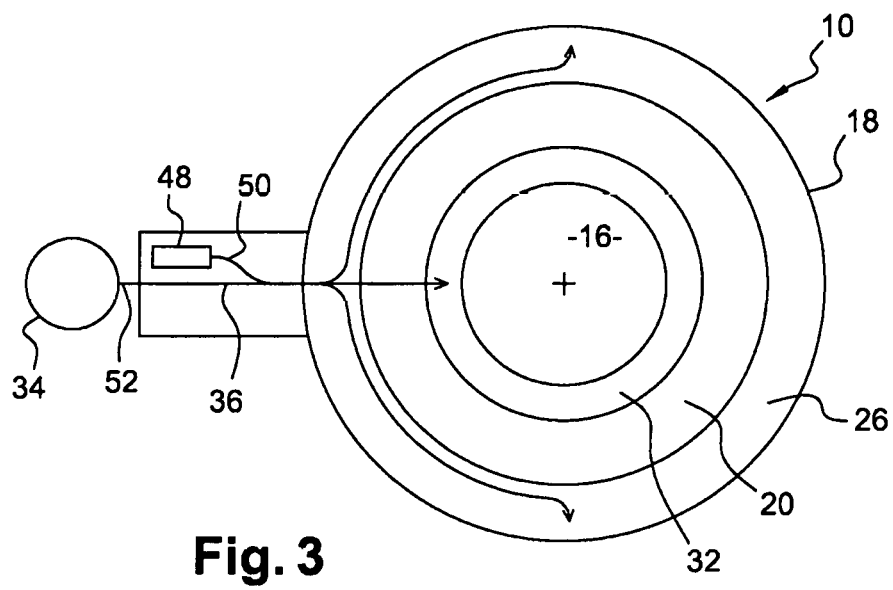
FIG. 3 is a view which corresponds to FIG. 2 and shows an embodiment of the invention.

Reference is now made to FIG. 3, which shows a first embodiment of the invention.

According to the invention, means are provided for supplying air to the pipe 36, this air being intended for being conveyed via the pipe 36 as far as the cavities 26, 32 in order to ventilate said cavities.

In the example shown, the air supply means comprise an electric ventilator fan 48, the air outlet 50 of which is connected to the pipe 36 in the region of the inlet 52 thereof connected to the supply means 34. This connection can be produced by means of a Y-shaped bypass (preferably upstream of the fire-resistant wall) of which one of the lateral legs is connected to the ventilator fan 48, the other lateral leg of which is connected to the supply means 34, and the central leg of which is connected to the cavities 26, 32. The connection between the ventilator fan 48 and the pipe 36 may consist of an electromagnetic valve or a non-return flap.

The ventilator fan 48 may be designed to output an air flow rate of between 1 and 500 g/s.

The ventilator fan 48 is preferably electrically controlled by control means which are independent of the engine 16 such that said ventilator fan can operate when the engine is not running. These control means are for example integrated in the electronic network of the aircraft.

In the example shown in FIG. 3, the ventilator fan 48 is housed in the strut 12.

Figure 4:
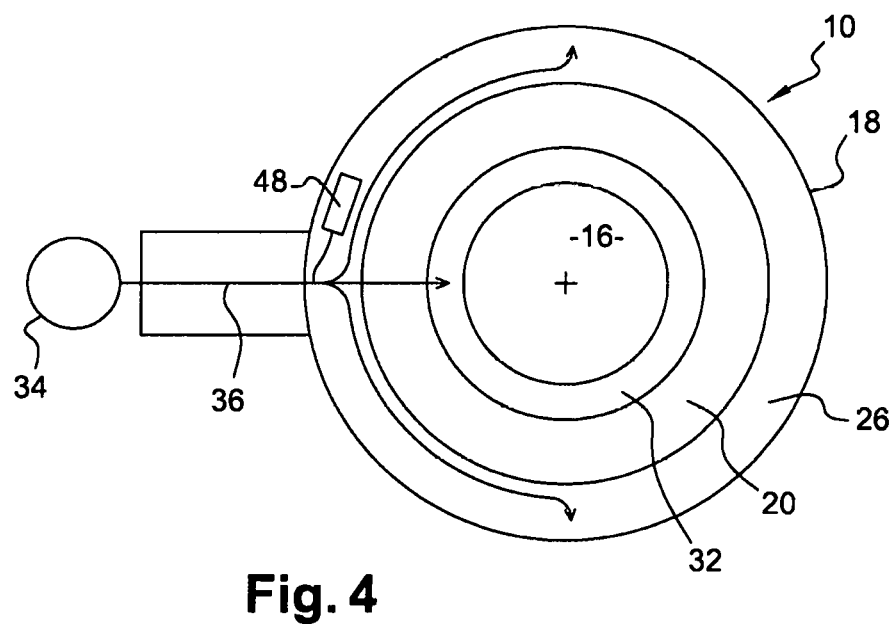
FIG. 4 is a view which corresponds to FIG. 2 and shows a variant of the invention.

The variant of the invention shown in FIG. 4 differs from the above-described embodiment basically in that the ventilator fan 48 is housed in the nacelle 18, i.e. in the annular cavity 26 in the nacelle. The ventilator fan 48 may be electrically controlled by control means of the engine which are designed to operate and remain in operation when the engine is not running.

As shown in FIG. 1, the invention may be applied to a propulsion assembly 10 fastened to a wing 14 of an aircraft, the strut 12 therefore being located at 12 (twelve o'clock) using a clock face analogy. In a variant and as shown in FIGS. 3 and 4, the invention may be applied to a propulsion assembly 10 which is fastened to the fuselage of the aircraft, the strut 12 therefore being located at 3 o'clock or 9 o'clock for example. It is also conceivable to apply the invention to other types of propulsion assemblies such as those that are inside the fuselage of the aircraft at least in part.

The invention claimed is:

1. An extinguishing system for extinguishing a fire which may break out in an engine and/or a nacelle surrounding the engine of an aircraft propulsion assembly, the extinguishing system comprising:
   a pipe in fluid communication with a cavity in the engine and/or a cavity in the nacelle;
   an extinguishing agent supply configured to provide an extinguishing agent to the pipe; and
   an air supply configured to provide ventilation air to the pipe, the ventilation air having a non-zero percentage of oxygen,
   wherein the extinguishing system is configured to selectively discharge the extinguishing agent from the pipe into the cavity/cavities to extinguish a fire, wherein the extinguishing system is configured to discharge the ventilation air from the pipe into the cavity/cavities to ventilate the cavity/cavities, and wherein the air supply includes an electric ventilator fan designed to output the ventilation air at an air flow rate of between 1 and 500 g/s, said ventilator fan being configured to operate when the engine is not running.

2. The extinguishing system according to claim 1, wherein the air supply is connected to said at least one pipe by a valve and/or a non-return flap.

3. The extinguishing system according to claim 1, wherein the air supply is housed in the nacelle.

4. The extinguishing system according to claim 1, further comprising a strut for connecting the propulsion assembly to the aircraft, said air supply being housed in the strut.

5. The extinguishing system according to claim 1, wherein the pipe comprises at least one outlet which is located close to an air intake scoop of the nacelle or of the engine.

6. A method for ventilating a cavity in an engine and/or a cavity in a nacelle of an aircraft propulsion assembly when the engine is not running, the propulsion assembly comprising an extinguishing system for extinguishing a fire which may break out in the engine and/or in the nacelle, the extinguishing system comprising an extinguishing agent supply configured to supply at least one pipe which has a first end and a second end and is configured to selectively dispense said extinguishing agent through the pipe into the cavity in the engine and/or the cavity in the nacelle to extinguish the fire, the method comprising:
   supplying ventilation air from an air supply into the first end of said at least one pipe, the ventilation air having a non-zero percentage of oxygen; and
   discharging the ventilation air received from the air supply out through the second end into the cavity in the engine and/or the cavity in the nacelle.

* * * * *